(12) United States Patent
Kang

(10) Patent No.: US 7,416,665 B2
(45) Date of Patent: Aug. 26, 2008

(54) PORE SIZE CONTROLLABLE FILTER

(75) Inventor: Youngbae Kang, Busan (KR)

(73) Assignee: Sungshin Engineering Co., Ltd., Seoul (KR)

( * ) Notice: Subject to any disclaimer, the term of this patent is extended or adjusted under 35 U.S.C. 154(b) by 221 days.

(21) Appl. No.: 10/482,802

(22) PCT Filed: Feb. 26, 2002

(86) PCT No.: PCT/KR02/00308

§ 371 (c)(1),
(2), (4) Date: Jan. 5, 2004

(87) PCT Pub. No.: WO02/068087

PCT Pub. Date: Sep. 6, 2002

(65) Prior Publication Data

US 2004/0206685 A1    Oct. 21, 2004

(30) Foreign Application Priority Data

Feb. 27, 2001    (KR) ............................ 2001-9831

(51) Int. Cl.
*B01D 33/00*    (2006.01)
(52) U.S. Cl. .................. 210/237; 210/238; 210/350; 210/359; 210/497.1; 210/503
(58) Field of Classification Search .......... 210/350, 210/387, 411, 494.1, 497.1, 337, 338, 359, 210/393, 505, 508, 237, 238; 55/302, 475, 55/490, 520
See application file for complete search history.

(56) References Cited

U.S. PATENT DOCUMENTS

| | | | |
|---|---|---|---|
| 2,785,804 A | * | 3/1957 | Fernandez ............... 210/91 |
| 2,827,174 A | * | 3/1958 | Fernandez ............... 210/91 |
| 4,299,699 A | | 11/1981 | Boogay |
| 4,411,791 A | | 10/1983 | Ward |
| 5,174,907 A | | 12/1992 | Chown et al. |
| 5,439,588 A | | 8/1995 | Chown et al. |

FOREIGN PATENT DOCUMENTS

EP    0 594 216 A1    10/1993

(Continued)

OTHER PUBLICATIONS

Abstract of Korean Application No. 10-1997-0050047, filed Sep. 30, 1997, Publ. No. 10-1997-0074668, Publ. of Reg. No. 10-2000-0241198, Pat. No. 10-0241198, "Filtration Equipment with Variable Filter Layer," Choong Hyun Choi.

(Continued)

*Primary Examiner*—Joseph W Drodge
(74) *Attorney, Agent, or Firm*—Birch, Stewart, Kolasch & Birch, LLP

(57) ABSTRACT

The pore size controllable filter can separate and remove effectively the suspended solid and eliminate rapidly it captured by the device. The filtering materials (21) are built on the upper filtering material holder (23) and the lower filtering material holder (24) of radial type facing each other at a certain distance in the filtering tub (2), forming a filtering layer (21a). According to the direction and the degree of rotation of the upper handle (28) connected to the upper rotation axis, the filtering materials (21) come together to the center along the upper filtering material holder (23) and the lower filtering material holder (24). Then one side or both sides are twisted in opposite directions and concentrated around the perforated pipe (22) located at the central axis or restored to the original state. Accordingly, the size of the pore created between the filtering materials (21) can be adjusted, enabling to conduct filtering and washing operations at a proper level.

10 Claims, 4 Drawing Sheets

FOREIGN PATENT DOCUMENTS

| | | |
|---|---|---|
| EP | 0594216 A1 | 4/1994 |
| EP | 0 756 884 A1 | 2/1997 |
| EP | 0756884 A1 | 2/1997 |
| GB | 1 375 628 | 11/1974 |
| JP | 61-238305 A | 10/1986 |
| KR | 95-31165 A | 12/1995 |

OTHER PUBLICATIONS

Abstract of Korean Application No. 10-1998-0040542, filed Sep. 29, 1998, Publ. No. 10-1999-0030247, "Permanent Filtration Equipment with Variable Filter Layer," Choong Hyun Choi.

Abstract of Korean Application No. 10-1994-0012111, filed May 31, 1994, Publ. No. 10-1995-0031165, Publ. of Reg.No. 10-1997-0007944, Pat. No. 10-0125655-0000, "Waste Water Processing Filter," Young Keun Kim et al.

* cited by examiner

PORE SIZE CONTROLLABLE FILTER

TECHNICAL FIELD

The present invention relates to a pore size controllable filter capable of removing a suspended substance in water, and in particular to a pore size controllable filter which is capable of forming a filtering layer (21a) by connecting a filtering material (21) having a good expansion and contraction characteristic to a radial shape filtering material holder (23) and lower filtering material holder (24) which are opposite each other at a certain distance, so that it is possible to decrease the sizes of pores in such a manner that the filtering material (21) engaged to the upper filtering material holder (23) and lower filtering material holder (24) is wound onto a perforated pipe (22) positioned in a center shaft based on a rotation direction and degree of a rotary shaft, receives a certain tension force and is moved in a central direction along the upper filtering material holder (23) and lower filtering material holder (24) and it is possible to increase the sizes of pores by recovering the filtering material (21) to its original states, whereby it is possible to implement easier filtering and washing operations.

BACKGROUND ART

As shown in FIG. 1, a conventional filter includes a raw water supply pipe (2), a processing water discharging pipe (7), a washing water supply pipe (6), a discharging pipe (1), and a filtering layer (4) formed of filtering materials. An air supply pipe (5) and a pressure adjusting and air discharging valve (8) are further provided for implementing an easier washing operation.

The operation of the above filter is divided into a filtering process and a washing process.

In the filtering process, raw water including a suspended substance is flowed into a filter for thereby producing processed water from which a suspended substance is filtered. In addition, in the filtering process, the pores formed in the filtering layer of the filter are directed to capturing the suspended substances in the raw water based on a complicated mechanism such as a mass separation, precipitation, inertia collision, blocking, absorption, cohesion methods for thereby producing a clean water as a processed water.

As the filtering process is continuously performed, the suspended substances are filled in the pores formed in the filtering layer, and the filtering resistance is increased. When the filtering resistance exceeds a certain degree, the filtering process is not performed. At this time, the washing is performed for eliminating the suspended substances filled in the pores by supplying a clean washing water and air. At this time, the performance of the filter is determined based on an eliminating ratio of the suspended substances, a filtering rate, a filtering duration time, the amount of a washing water, a washing frequency, a washing time, etc.

As the filtering materials that are filled into the filtering layer, there are known an inorganic granular material such as sand, anthracite, coal, etc. The above filtering materials may be easily obtained and are capable of filtering a particle smaller than the size of the pore formed by the filtering substances. However, in the filtering layer formed of the above filtering materials, since a filtering space for filtering the suspended materials is limited to a surface portion, the filtering resistance is fast increased due to the closed states of the pores. Therefore, the reverse-washing process must be frequently performed. In order to overcome the above problem in which the suspended substances are mainly captured in a surface portion, a filter in which a filtering layer is formed in a double layer or multiple layers is developed. In the above filter, filtering materials each having different granular diameters and densities are formed in each layer and the layers are not distinctly separated. Therefore, as the washing process is continuously performed, the boundaries between the neighboring layers are indefinite. Therefore, it is impossible to implement a desired purpose. In addition, when the granular filtering material is used, the filtering materials may be lost during the reverse-washing process.

Recently, according to a filter (Patent No. 10-0241198), in order to enhance the performance of the filter, a fiber material is used as a filtering material. In this case, a fiber material is fixed to a lower portion of the filter, and a raw water supply pressure pressurizes the filtering material, and the pressure of air and washing water expands the filtering material. According to the above filter, since a filtering layer is single, and the pressurizing degree of the filtering material is determined based on the supplying pressure of the raw water, the space for capturing the suspended substances is small, so that the filtering duration time is decreased, and the frequency of the washing operation is increased, and it is not easy to cope with the change of the quality of the flowing-in water. In addition, it is difficult to adjust the quality and amount of water. In order to overcome the above problems, a permanent type filter (Laid-open No. 1999-030247), which includes a variable type filter layer using a piston is developed. In the above filter, since the filtering material is pressurized and depressurized by the piston in the vertical direction, if the above filter is used for a long time, the filtering materials may be tangled, so that the filtering materials may not be fully recovered during the washing operation, and it is impossible to implement a desired washing operation.

In addition, according to a filter (Patent No. 1997-0007944), the filtering material is installed in a concentric shape between a movable circular plate and a fixed circular plate, and the movable circular plates are rotated for thereby pressurizing the filtering materials. However, the above filter has a disadvantage in that the filtering materials positioned near the circular plates are not pressurized, and the movable circular plate is moved in the direction of the fixed circular plate for thereby performing a pressurizing operation in order for the filtering material not to receive a tension force. In this case, the filtering area is too small compared to the size of a filtering tub (2). In addition, since the rotary shaft is moved through the filtering tub (2), it is impossible to implement a pressurizing filtering operation.

DISCLOSURE OF INVENTION

Accordingly, it is an object of the present invention to provide a pore size controllable filter which overcomes the problems encountered in the conventional art and which is capable of enhancing a filtering speed and a filtering duration time, effectively filtering a suspended substance from water by decreasing a washing frequency and the amount of washing water and simplifying a water processing operation In order to achieve the above objects, there is provided a pore size controllable filter in which the radial shape filtering material holders engaged to a rotary shaft or fixed shaft are installed opposite to each other at a certain distance, the filtering materials having a good expansion and contraction characteristic are connected to both filtering material holders for thereby forming a filtering layer, the filtering materials hanging on the filtering material holders are wound onto the perforated pipe based on the rotation direction and degree of the rotary shaft and are moved in the center direction along the filtering material holders based on a tension force for thereby decreasing the sizes of the pores and implementing a desired filtering operation, and increasing the sizes of the pores by recovering the filtering materials to their original states for thereby implementing a reverse-washing operation.

In particular, since the filtering materials positioned near the filtering material holders may be moved in the center direction along the filtering material holders, it is possible to maintain a uniform pore size based on the perforated pipe. In addition, it is possible to change the sizes of the pores based on the distance from the perforated pipe by changing the lengths of the filtering materials by separating the inner and outer sides of the filtering layer and diversifying the types of the filtering materials. And it is possible to maximize the filtering cross-section area. Therefore it is possible to overcome the problems encountered in the conventional art.

In addition, since the filtering materials are rotated and squeezed using a handle, it is possible to implement the same pressurizing degree even using a smaller force than in the method in which the filtering materials are pressurized using a piston. The filtering materials maintain a fully loosened state even when the filtering materials are used for a long time for thereby implementing a clean state of the same. Since the filtering cross-section area according to the present invention corresponds to a surface area of the perforated pipe compared to the conventional art in which the filtering cross section area of the filter is limited to the vertical cross section area of the filtering tub (2), it is possible to increase the filtering cross section area by increasing the diameters of the perforated pipe and increasing the height of the filtering tub (2) without increasing the cross section area of the filtering tub (2).

BRIEF DESCRIPTION OF THE DRAWINGS

The present invention will become better understood with reference to the accompanying drawings which are given only by way of illustration and thus are not limitative of the present invention, wherein.

DESCRIPTIONS OF IMPORTANT ELEMENTS OF THE DRAWINGS

FIG. 1

| | |
|---|---|
| (1) washing water discharging pipe | (2) raw water supply pipe |
| (3) filter main body | (4) filtering layer |
| (5) washing water air supply pipe | (6) washing water supply pipe |
| (7) processing eater discharging pipe | (8) air discharging valve |

FIGS. 2, 3, 4

| | |
|---|---|
| (1) raw water supply unit | (11) raw water supply pipe |
| (11a) raw water supply valve | (12) upper washing water discharging pipe |
| (12a) upper washing water discharging valve | (13) upper flange |
| (14) safety valve | (15) filtering material escape prevention ring |

-continued

| | |
|---|---|
| (2) filtering tub | (21) filtering material |
| (21a) filtering layer | (22) perforated pipe |
| (22a) perforated pipe fixing ring | (23) upper filtering material holder |
| (24) lower filtering material holder | (25) upper rotary shaft |
| (26) upper rotary shaft sealing portion | (27) upper rotary shaft bearing |
| (28) upper handle | (28a) upper handle fixing pin |
| (29) lower handle | (29a) lower handle fixing pin |
| (3) processing water discharging portion | (31) processing eater discharging pipe |
| (31a) processing water discharging valve | (32) washing water supply pipe |
| (32a) washing water supply valve | (33) lower flange |
| (34) washing air supply pipe | (34a) washing air supply valve |
| (34b) washing air discharging port | (35) lower washing water discharging pipe |
| (35a) lower washing water discharging valve | (36) lower rotary shaft |
| (37) lower rotary shaft sealing portion | (38) lower rotary shaft support |
| (39) lower rotary shaft bearing | |

BEST MODE FOR CARRYING OUT THE INVENTION

Figure 1:
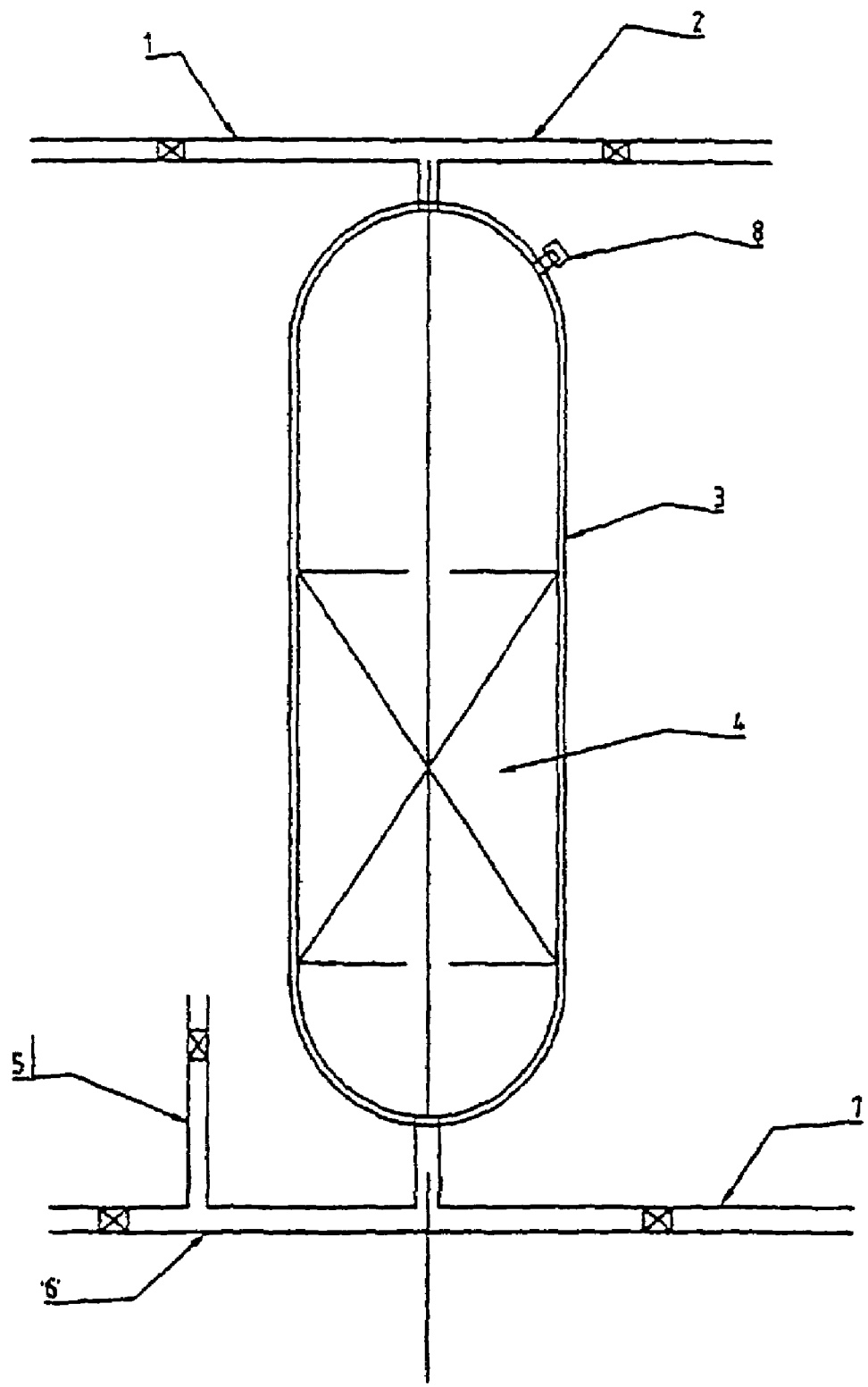
FIG. 1 is a view illustrating a conventional filter.
Figure 2:
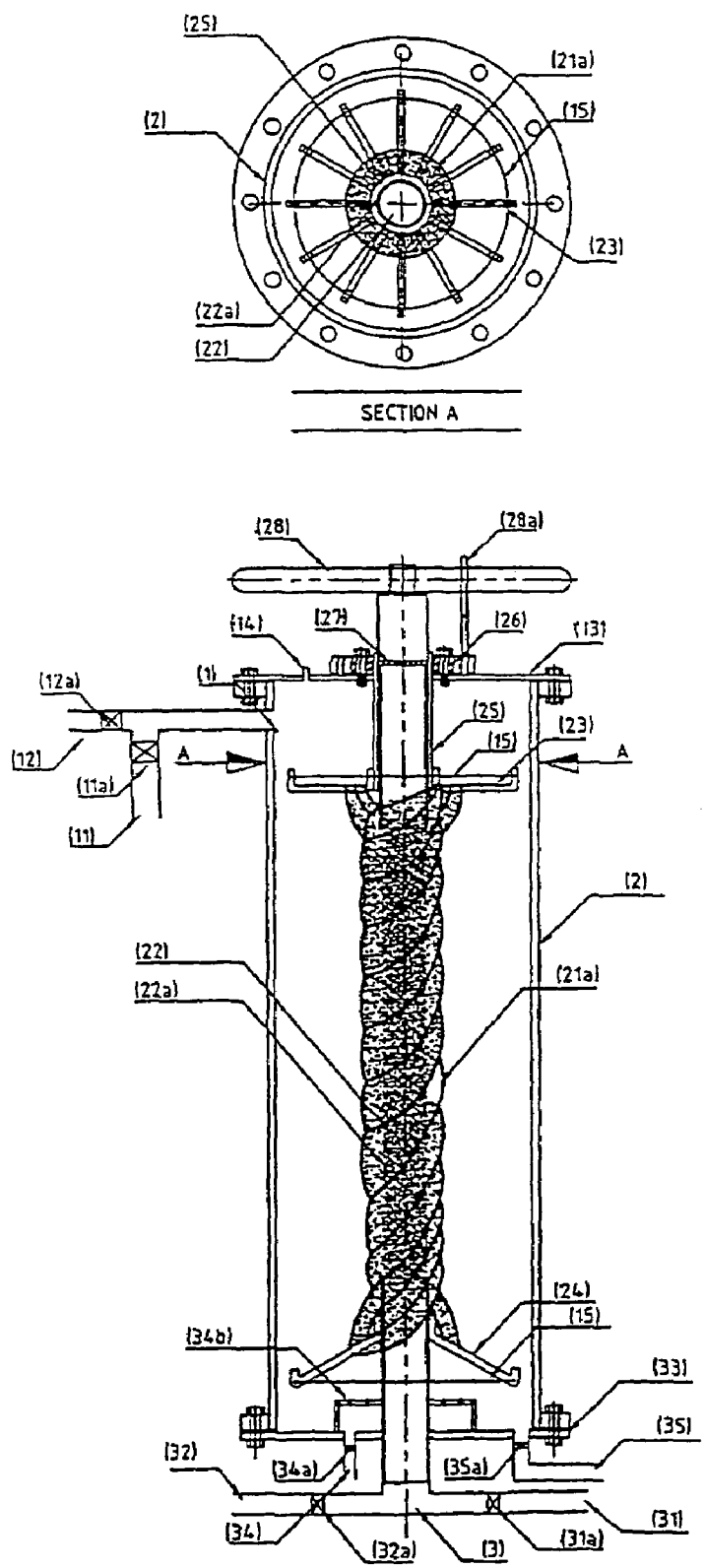
FIG. 2 is a view illustrating a one-stage rotation pore size controllable filter (a pressurizing state of a filtering material) according to the present invention.

FIG. 2 is a view illustrating a one-stage rotation pore controllable filter according to an embodiment of the present invention. As shown therein, a raw water supply unit (1), a filtering layer (21a), and a processing water discharging portion (3) are installed from a circumferential direction of the filtering tub (2) to a center direction. In an upper flange (13) of the filtering tub (2), a hole is formed to which an upper rotary shaft sealing portion (26) is engaged in order for water to flow through a hole into which the upper rotary shaft (25) is inserted and a gap between the upper rotary shaft (25) and the upper flange (13), and a pipe is welded for engaging a safety valve (14) and implementing a pressure measurement. A perforated pipe (22) passes through a lower flange (33) of the filtering tub (2) and is welded thereto, and a pipe is welded for connecting the washing air supply pipe (34). One side of the upper rotary shaft (25) is connected with the upper handle (28), and the upper filtering material holder (23) is engaged in a radial direction for hanging the filtering material (21) in an outer side of the other side of the same. The lower filtering material holder (24) is welded in a radial shape in the perforated pipe (22) welded to the lower flange (33) of the filtering tub (2) for thereby hanging the filtering material (21) thereon, and one end of the perforated pipe (22) is inserted into the lower rotary shaft (36). At this time, the multiple pore portion of the perforated pipe (22) is positioned only between both the filtering material holders.

The upper filtering material holder (23) attached to the upper rotary shaft (25) is rotated in the same direction as the upper rotary shaft (25). Since the lower filtering material holder (24) attached to the perforated pipe (22) is fixed, the lower filtering material holder (24) is not rotated. Therefore, when the upper rotary shaft (25) is rotated, the filtering materials (21) hanging on the upper and lower filtering material holders is wound onto the perforated pipe (22) positioned in the center portion and receives a tension force. Since the filtering material holders are installed in the radial direction, the filtering materials (21) are moved in the center direction, so that the pores formed between the filtering materials (21) are decreased at all positions of the filtering layer (21a). At this time, the filtering materials (21) must be installed longer than the distance between the upper and lower filtering material holders in order for the filtering materials (21) to be fully wound onto the perforated pipe (22) and to receive a tension force. The filtering material (21) having a smaller diameter is first inserted into the upper and lower filtering material holders, and the outer filtering material (21) must have a longer length for thereby implementing a double layer filtering function. After the filtering material (21) is engaged, a filtering material escape prevention ring (15) is inserted onto the ends of the upper and lower filtering material holders for preventing an escape of the filtering material (21).

In the filtering process, the filtering material (21a) is fully washed, and the filtering material (21) is pressurized near the perforated pipe (22) by rotating the upper handle (28) in a state that only the processing water discharging valve (31a) and the raw water supply valve (11a) are opened, and the upper handle (28) is fixed with the upper handle fixing pin (28a) for thereby flowing and filtering the raw water. In this state, as the filtering process is continuously performed, the suspended substances are increased in the filtering layer (21a) in the filter, and the filtering resistance is increased. As the discharging speed of the processing water is decreased, and the pressure is increased, the captured suspended substances are discharged together with the processing water. At this time, if the discharging speed of the processing water is below a preset value, or the pressure of the filtering tub (2) is higher than a preset value, or if the water quality is degraded rather than a desired degree, the filtering operation is stopped, and the routine is changed to the washing process.

Figure 3:
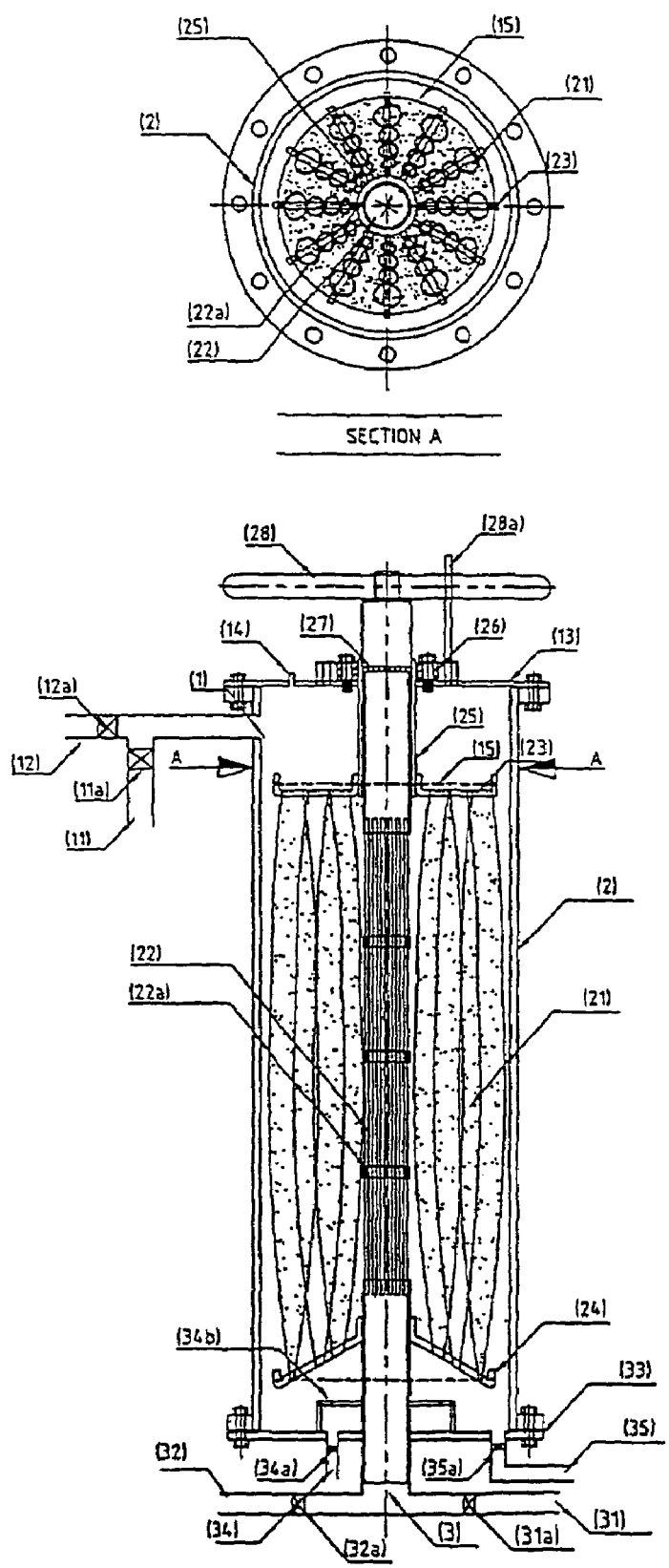
FIG. 3 is a view illustrating a one-stage rotation pore size controllable filter (a loosened state of a filtering material) according to the present invention.

The washing process may be performed based on an automatic or manual method. The raw water supply valve (11a) and the processing water discharging valve (31a) are closed, and the lower washing water discharging valve (35a), the washing air supply valve (34a), and the washing water supply valve (32a) are opened in a sequence, and all the remaining valves are closed. Thereafter, the handle fixing pin (28a) is removed, and the upper handle (28) is rotated in the reverse direction for thereby fully loosening the filtering material (21). As shown in FIG. 3, the upper handle (28) is continuously rotated in both directions for thereby washing the filtering material (21). The pressurizing and loosening operations are repeatedly performed line like washing clothes in flowing water for thereby removing the suspended substances captured in the interior of the filtering layer (21a). The polluted washing water is discharged to the lower washing water discharging pipe (35). When it is judged that the suspended substances captured in the filtering layer (21a) are fully removed, the filtering process is started.

Figure 4:
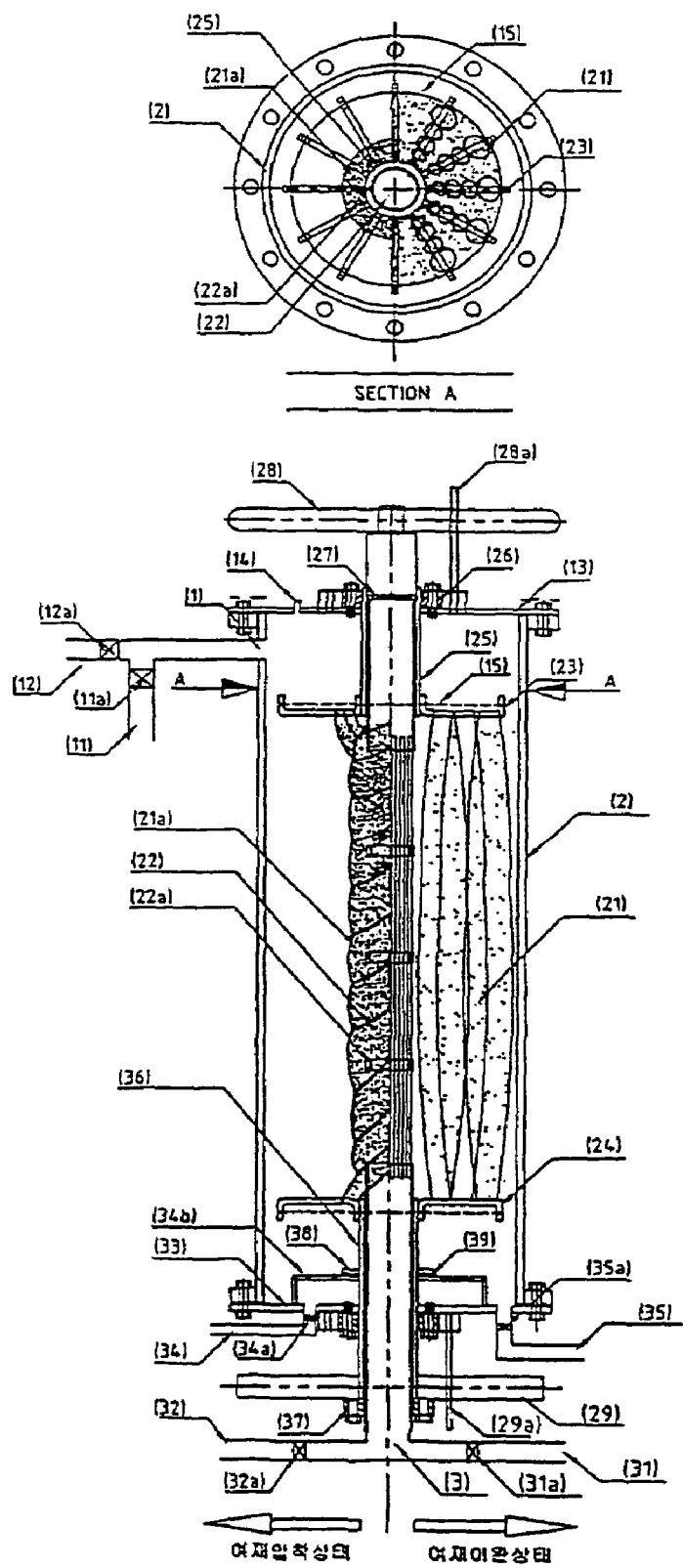
FIG. 4 is a view illustrating a two-stage rotation pore size controllable filter according to the present invention.

FIG. 4 shows a 2 stage rotation pore size controllable filter having an upper handle 28 and lower handle 29, an upper rotary shaft 25 and a lower rotary shaft 36.

INDUSTRIAL APPLICABILITY

As described above, in the present invention, the filtering material holders fixed to the rotary shaft or fixed shaft are installed in the filtering tub in a radial shape opposite to each other at a certain distance there between, and the filtering materials each having a good expansion and contraction characteristic are connected for thereby forming a filtering layer, and the filtering materials hanging on the filtering material holders are wound onto the perforated pipe positioned in the center shaft based on the rotation direction and degree of the rotary shaft and receive a certain tension force and are moved in the direction of the center portion along the filtering material holders. Therefore, in the present invention, it is possible to decrease the sizes of the pores for thereby implementing a desired filtering operation, and it is possible to increase the sizes of the pores by recovering the filtering materials to their original states for thereby implementing a reverse washing operation. In the present invention, it is possible to easily separate and remove the suspended substances of various sizes in a certain solution, and it is possible to easily separate the suspended substances captured in the filtering layer. The filter according to the present invention is designed to obtain the area of the filtering layer in maximum, and the washing frequency and the amounts of the washing water are significantly decreased. The pore size controllable filter according to the present invention may be well adapted to a practical filter.

What is claimed is:

1. A filter for filtering a substance suspended in solution, comprising:
    a filtering tub;
    a shaft of perforated pipe within said tub;
    an upper rotary shaft, said shaft of perforated pipe being positioned within said upper rotary shaft;
    an upper filtering material holder fixed to said upper rotary shaft; and
    a lower filtering material holder fixed to said shaft of perforated pipe;
    said upper filtering material holder and said lower filtering material holder, each formed of a plurality of bars extending in the radial direction and being separated from each other in the axial direction by a distance;
    filtering material being connected to said upper and lower filtering material holders, said filtering material having a good expansion and contraction characteristic, said filtering material hanging on the upper and lower filtering material holders in a loop;
    said filtering material being wound about said perforated pipe in a helical fashion, said filtering material hanging on said upper and lower filtering material holders, and said filtering material moving along said upper and lower filtering material holders due to a rotation of said upper rotary shaft and upper filtering material holder;
    whereby said filtering material receives a tension force so as to decrease the size of the pores and implement a desired filtering operation;
    said filtering material being unwound to implement a reverse washing operation whereby the size of the pores are increased.

2. The filter of claim 1, further comprising:
    an upper handle connected to the upper rotary shaft;
    a lower rotary shaft, said shaft of perforated pipe being positioned within said lower rotary shaft; and
    a lower handle connected to said lower rotary shaft;
    wherein said upper filtering material holder and said lower filtering material holder are engaged to the upper rotary shaft and the lower rotary shaft, respectively, and the upper handle the lower handle are rotated in order for the upper filtering material holder and the lower filtering material holder to be rotated in reverse directions, respectively.

3. The filter according to claim 2, wherein said upper filtering material holder and said lower filtering material holder are connected with a driving force transfer apparatus and a rotation direction conversion apparatus in order to rotate said upper filtering material holder and said lower filtering material holder in reverse directions to thereby implementing pressurizing and loosening of the filtering material using one handle.

4. The filter of one of claim 2, claim 1 or claim 3, wherein one filtering tub includes a plurality of filtering layers each having a rotary shaft and processing water discharging portion.

5. The filter according to claim 1, wherein said solution is introduced into said tub through a raw water supply pipe and the filtered solution leaves the tub through a processing water discharging pipe.

6. The filter according to claim 1, wherein washing water is introduced into said tub through a washing water supply pipe and polluted washing water is discharged through a lower washing water discharging pipe.

7. The filter according to claim 1, wherein at least one of said upper and lower filtering material holders extend at an angle to said shaft of perforated pipe, so that the distance between said upper filtering material holder and said lower filtering material holder increases when moving in a radial direction.

8. The filter according to claim 1, wherein said filtering material is looped repeatedly between said upper and lower filtering material holders so as to form a plurality of loops which overlap as the filtering material is wound about the shaft of perforated pipe.

9. The filter according to claim 1, wherein said upper rotary shaft is connected to an upper handle which is rotated to wind and unwind the filtering material.

10. The filter according to claim 9, wherein said lower filtering material holder is fixed.

* * * * *

UNITED STATES PATENT AND TRADEMARK OFFICE
CERTIFICATE OF CORRECTION

| | |
|---|---|
| PATENT NO. | : 7,416,665 B2 |
| APPLICATION NO. | : 10/482802 |
| DATED | : August 26, 2008 |
| INVENTOR(S) | : Youngbae Kang |

Page 1 of 1

It is certified that error appears in the above-identified patent and that said Letters Patent is hereby corrected as shown below:

On the Title Page:

At item (73), please amend the Assignee's city.

Change from: (73)　　Assignee:　　Sungshin Engineering Co., Ltd., Seoul (KR)

Change to:　　(73)　　Assignee:　　Sungshin Engineering Co., Ltd., Busan (KR)

Signed and Sealed this

Fourteenth Day of October, 2008

JON W. DUDAS
*Director of the United States Patent and Trademark Office*